United States Patent

Tesch

[11] 3,997,212
[45] Dec. 14, 1976

[54] SNOWMOBILE WINDSHIELD ASSEMBLY
[75] Inventor: Roger Howard Tesch, Beaver Dam, Wis.
[73] Assignee: Deere & Company, Moline, Ill.
[22] Filed: July 3, 1975
[21] Appl. No.: 592,870
[52] U.S. Cl. .............................. 296/84 A; 296/90; 180/5 R
[51] Int. Cl.² ............................................ B60J 1/02
[58] Field of Search ............... 296/84 A; 90; 180/5 R

[56] References Cited
UNITED STATES PATENTS

| 3,637,254 | 1/1972 | Lapointe | 296/84 A |
| 3,819,226 | 6/1974 | Sykora | 180/5 R |

Primary Examiner—Robert R. Song

[57] ABSTRACT

The windshield of a snowmobile has a rubber molding or gasket fitted over the lower edge thereof and received in a complementary groove formed in the snowmobile cowling. The bottom of the groove is provided with a plurality of spaced slots and the windshield includes tabs which extend through the rubber molding and through the slots. A spring metal clip is attached to the bottom of each of the tabs through means of a screw and each clip includes leg portions which are biasedly engaged with the bottom of the cowling when the screw is installed to thereby urge the windshield downwardly so as to firmly seat the rubber molding in the groove.

3 Claims, 3 Drawing Figures

SNOWMOBILE WINDSHIELD ASSEMBLY

BACKGROUND OF THE INVENTION

The present invention relates to a windshield installation for a vehicle such as a snowmobile or the like.

Snowmobiles commonly include a forward mounted engine covered by a cowling having a rearward edge to which a windshield made of plastic or a similar flexible transparent material is connected to means of a plurality of brackets. This type of construction is not entirely satisfactory since it imposes a limitation on the design of the cowling since the latter cannot be extended rearwardly beyond the location desired for mounting the windshield.

One design for overcoming the above noted objection to known mountings of windshields to cowlings is represented in U.S. Pat. No. 3,637,254 issued on 25 Jan. 1972 to Lapointe et al. In the Lapointe et al device the windshield is mounted in a groove or trough formed in the cowling through means including a molding located in the groove and receiving the lower edge of the windshield and a plurality of clips which are respectively located in a plurality of openings in the lower edge of the windshield and which have lower ends extending through a plurality of openings provided in the groove in the cowling, the ends being bent so as to engage the lower side of the cowling and hold the windshield in place.

While the Lapointe et al device does permit the designer to have the desired latitude in designing the cowling, it has the disadvantage that the clips are cumbersome to install and are likewise cumbersome to remove in order to replace the windshield should it become damaged.

SUMMARY OF THE INVENTION

According to the present invention, there is provided a novel windshield assembly for a snowmobile, or the like.

A broad object of the invention is to provide a windshield assembly wherein the windshield is mounted in a groove provided in a cowling and is retained in its mounted position by easily installable and removable fastener means. A more specific object of the invention is to provide a windshield assembly wherein the windshield includes a plurality of tabs which extend through openings provided in the groove of the cowling and wherein yieldable clips are respectively engaged with the tabs and have leg portions which are held in deflected positions in engagement with the bottom of the groove in the cowling through means of respective screw fasteners.

These and other objects will become apparent from a reading of the following description in conjunction with the appended drawing.

DESCRIPTION OF THE PREFERRED EMBODIMENT

Figure 1:
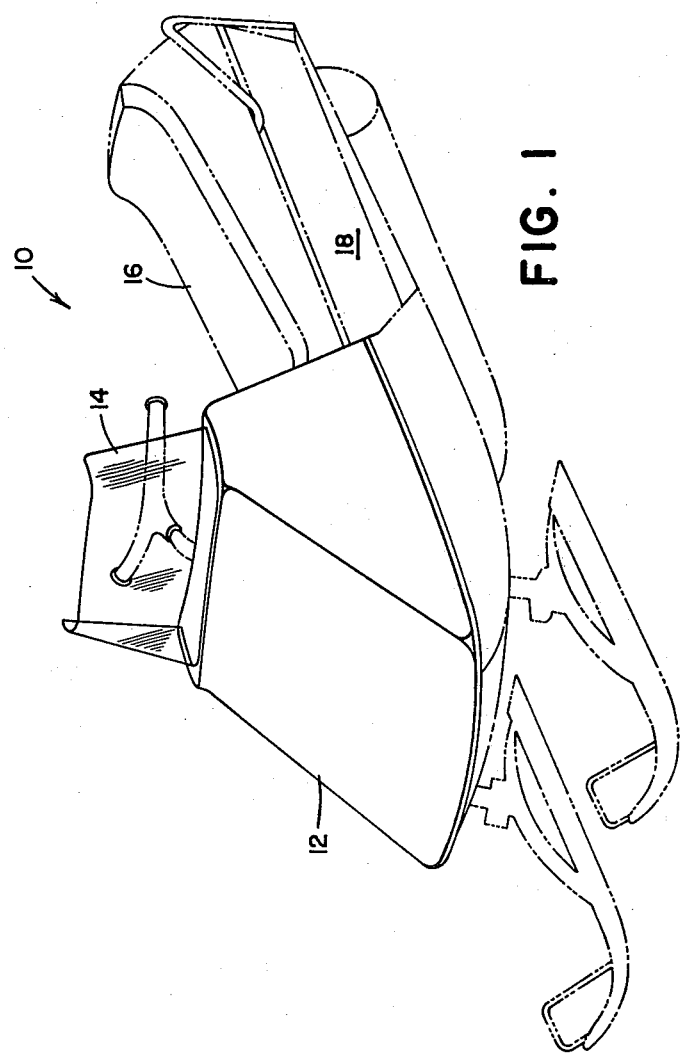
FIG. 1 is a perspective view of a snowmobile embodying a windshield assembly constructed according to the principles of the present invention.

Referring now to FIG. 1, therein is shown a snowmobile indicated in its entirety by the reference numeral 10. The snowmobile 10 includes a nose or cowling 12 which covers the snowmobile engine (not shown) and serves as a mounting base for a curved windshield 14. Windshield 14 is located forwardly of a seat 16 which is mounted on a frame 18.

Figure 2:
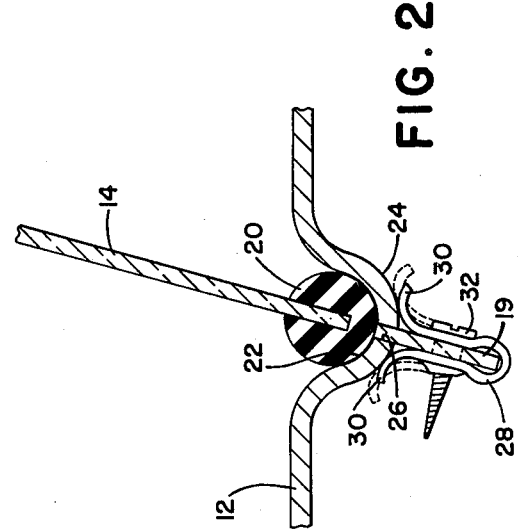
FIG. 2 is a vertical sectional view showing one of the points of connection of the windshield with the cowling.

The windshield 14 (FIG. 2), has a lower edge defining a plurality of tabs 19 (only one shown) which extend through respective openings provided in a molding or gasket 20. The molding 20 may be made of any resilient material such as rubber or the like, and as can best be seen in FIG. 2, the molding 20 is circular in end view and is seated in a complimentary shaped groove or through 22 formed in the cowling 12, the formation of the groove 22 resulting in a rounded rib 24 being formed on the lower side of the cowling 12. A plurality of spaced openings 26 are located in the bottom of the groove 22 and respectively receive the tabs 19.

For holding the windshield in place, fastener means are provided including a U-shaped clip 28 mounted on each of the tabs 19 so that its opposite legs straddle the windshield. The legs of each of the clips 28 respectively include arcuate terminal end portions 30 which are curved away from the windshield 14 and present rounded surfaces which are held in engagement with the rib 24 through means of a screw 32 extending through the clip and an associated one of the tabs 19. It is to be noted that the clips 28 are constructed such that they are normally in a free state wherein the legs thereof diverge from each other as shown in dashed line in FIG. 2, the screws 32 being operative when the windshield is installed to hold the clips in a deflected position as shown in solid lines in FIG. 2 wherein the terminal ends 30 of the legs of the clips are held in biased engagement with the rib 24. It is to be noted that the length of the clips 28 is chosen such that when the legs of the clips are drawn tight against the windshield by the screws 32, the legs of the clips will act to move the windshield 14 downwardly to compress the molding 20 a predetermined amount so as to insure a tight fit between the molding and the bottom of the groove 22.

Figure 3:
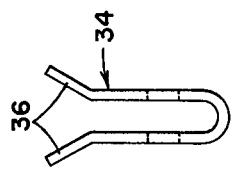
FIG. 3 is an end view of a clip which is a variation of the clip shown in FIG. 2.

Referring now to FIG. 3, therein is shown a clip 34 which is similar in design to the clips 28 but different therefrom in that respective legs thereof are provided with angular terminal ends 36.

The operation of the means for fastening the windshield 14 to the cowling 12 is thought to be clear from the foregoing and no further description is given for the sake of brevity.

I claim:

1. A vehicle windshield assembly comprising: a windshield support having upper and lower surfaces of which the upper surface defines an elongate recess; said support having a plurality of spaced slots extending therethrough in said recess; a resilient gasket received in said recess and having openings extending therethrough in alignment with respective ones of said slots; a windshield having a lower edge defining a plurality of tabs respectively inserted in respective aligned openings and slots and interconnected by lower edge portions which are in engagement with said gasket; and a plurality fastener means respectively secured to the plurality of tabs, said plurality of fastener means each including a U-shaped spring metal clip having opposite legs disposed one on each side of a respective one of the tabs; said legs having respective end portions which bear on the lower surface of the support at respective first locations spaced from said one of the tabs when the clip is in a free condition; and screw means extending through the legs of each clip and the tab located therebetween and holdng the said respective end portions of the legs of each clip in respective second locations closer to the tab than said first positions when the screw means is tightened to thereby resiliently load the clip between the lower surface of the support and the tab.

2. A vehicle windshield assembly comprising: a windshield support having a relatively thin portion in which is formed a downwardly bulged rib defining an upwardly opening trough having a bottom provided with a plurality of spaced slots; an elongate resilient gasket located in said trough and having a plurality of openings extending therethrough in alignment with respective ones of said slots; a windshield having a lower edge defining a plurality of tabs respectively extending through aligned ones of the slots and openings; and a plurality of fastener means respectively connected to the plurality of tabs, each of said fastener means including a U-shaped spring metal clip including opposite legs disposed on opposite sides of a respective tab and normally diverging away from the tab and having respective end portions engaged with the rib when the clip is in a free condition; and a screw extending through each clip and tab and holding the clips in tightened conditions wherein a substantial length of the legs thereof bear against a respective tab.

3. A vehicle windshield assembly comprising: a windshield support having a relatively thin portion in which is formed a downwardly bulged rib defining an upwardly opening trough having a bottom provided with a plurality of spaced slots; an elongate resilient gasket located in said trough and having a plurality of openings extending therethrough in alignment with respective ones of said slots; a windshield having a lower edge defining a plurality of tabs respectively extending through aligned ones of the slots and openings; and a plurality of fastener means respectively connected to the plurality of tabs; each of said fastener means includes a U-shaped clip including opposite legs disposed on opposite sides of a respective tab and terminating in diverging end portions bearing against said rib; the opposite legs of each clip and each tab being provided with a hole forming a set of holes for receiving a removable fastener; each set of holes being disposed such that they are in alignment only when the gasket is compressed a predetermined amount by the windshield; and a fastener removably received in each set of holes.

* * * * *